(No Model.) 2 Sheets—Sheet 1.
A. VOEGE.
DRUM STRAP.
No. 256,520. Patented Apr. 18, 1882.
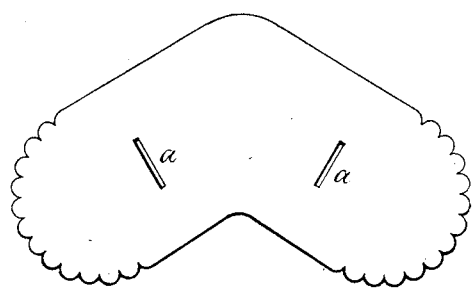
Fig. 1.
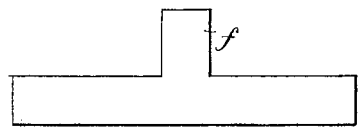
Fig. 2.
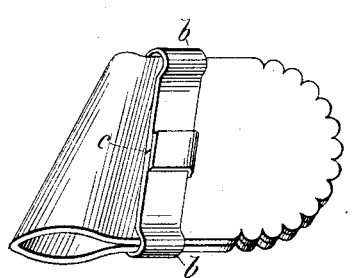
Fig. 4.
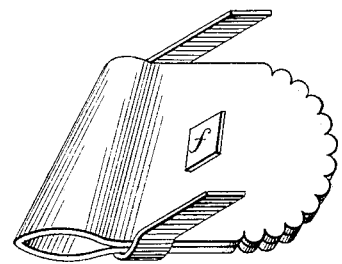
Fig. 3.
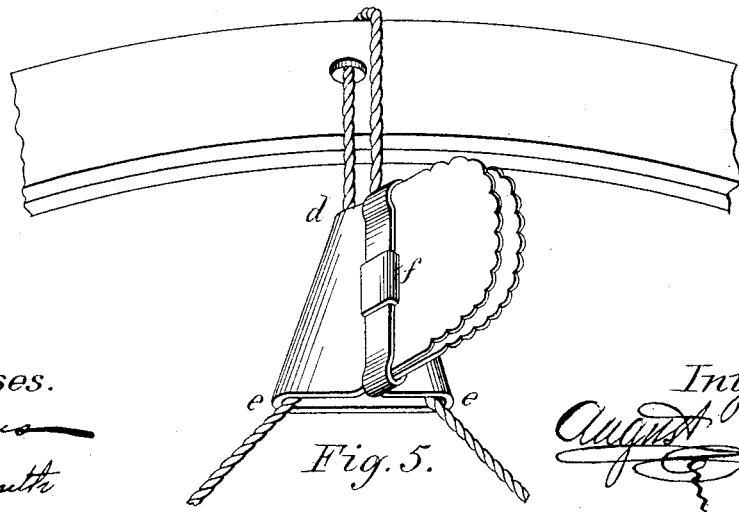
Fig. 5.
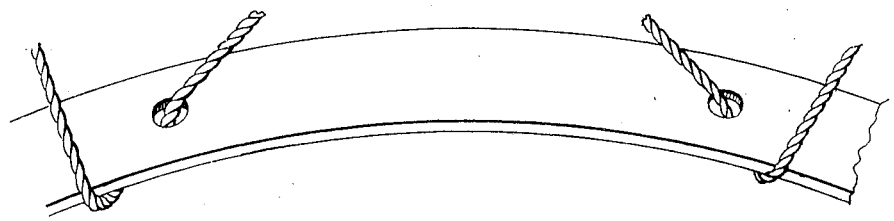
Witnesses.
Wm. H. Evans
Francis Smith
Inventor.
August Voege (No Model.) 2 Sheets—Sheet 2.

A. VOEGE.
DRUM STRAP.

No. 256,520. Patented Apr. 18, 1882.

Witnesses.
Wm. H. Evans
Francis Smith

Inventor.
August Voege

N. PETERS, Photo-Lithographer, Washington, D. C.

UNITED STATES PATENT OFFICE.

AUGUST VOEGE, OF BROOKLYN, NEW YORK.

DRUM-STRAP.

SPECIFICATION forming part of Letters Patent No. 256,520, dated April 18, 1882.

Application filed April 5, 1881. (No model.)

*To all whom it may concern:*

Be it known that I, AUGUST VOEGE, of the city of Brooklyn, Kings county, and State of New York, have invented a new and useful improvement in drum-straps to be placed on the cord-lacings used to hold on the upper and lower heads of drums, and tightening and loosening the same at will; and I do hereby declare the following to be a clear and exact description of the nature thereof, which will enable others skilled in the art to which my invention appertains to make and use the same, reference being had to the accompanying drawings, making part of this specification.

A drum-strap is used for the purpose, as shown on Figure 5, to work up and down on cord-lacings passing through apertures of a hoop bearing down on the parchment heads of drums for the purpose of securing and tightening and loosening the same for the purpose of tuning, &c.

Heretofore these straps have been cut in one straight strip from the material used, and laced or fastened with string. They have been found to be imperfect, owing to the fact that the strain on the strap from the cord-lacings of the drum is unequal, causing it to slip from the position on said cords and making it more liable to tear the strap, and the lacings or fastenings of the old drum-strap, being of string, will expand and contract with the changes of the weather, and will give or tighten, as the case may be. The string will also rot, causing the strap to be useless in a short time.

My improvement obviates all these difficulties, equalizing the strain on the drum-cords and on straps when adjusted, and obviating the expansion and contraction before mentioned. My improved strap also keeps in its place where placed on the drum-cords, when moved up and down thereon, and is not liable to give way. The fastening of straps, being of metal, will not rot, and is also, therefore, stronger and more durable, and is much more ornamental and less liable to wear out.

Figure 6:
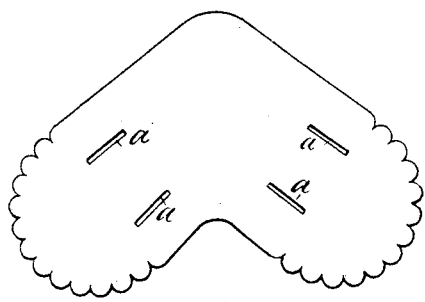
Figure 9:
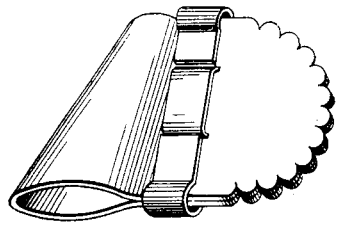

My invention consists of a piece of leather or any material suitable for the purpose cut in the shape shown by Figs. 1 and 6, cut from the material when lying flat, so that when closed or folded it forms an angle, as shown by Figs. 3, 4, 8, and 9. This leather or material is perforated with slits or apertures, (shown on Figs. 1 and 6 by the letters A A.) When the leather or material is folded these slits are brought together immediately opposite and in conjunction with each other. Two pieces of tin or metallic substance are then to be cut from the metal while lying flat—one in the shape shown on Fig. 2, with projection $f$, and one piece without said projection $f$. Both of said strips are to be cut of sufficient length so as to inclose the straps, as shown on Figs. 4 and 9, the ends of same meeting at center thereof. In the case of the piece with projection $f$, the projection is passed through the apertures, as shown on Fig. 3. The ends of the metal strips are then bent down on said strap in such a manner, as shown in Figs. 3 and 4, as to leave a round head or end to the bend of the metal on the leather or other material, thereby preventing the metal cutting same, when so bent down the ends meeting in center of strap. The projection $f$ is then bent over on said two ends of said metal with a similar round or convex turn or head, thereby forming a perfectly tight and secure fastening or lacing. This, it will be observed, fastens and laces across the strap. The other method I shall now describe leads to precisely the same result, and is a modification of my improvement, the only difference over that above described being that the lacing or fastening of the strap is up and down instead of across it, and it is formed thus: The piece of material, cut and perforated as shown in Fig. 6 by the letters A A, is folded, and the piece of metal cut without the projection $f$ is then inserted in the slits or apertures, as shown on Fig. 8. The ends are then folded or bent across the top and bottom of strap, the respective ends, when folded, reaching up to the upper and lower apertures, as shown in Fig. 9, the bend forming a convex head or end, as before described, said strip, when folded and pressed and fastened on the leather or other material, forming a piece of the shape shown by Fig. 7. This device, whether the lacing is lengthwise or across the material, makes a perfect strap for the purposes described.

Figure 7:
Figure 8:
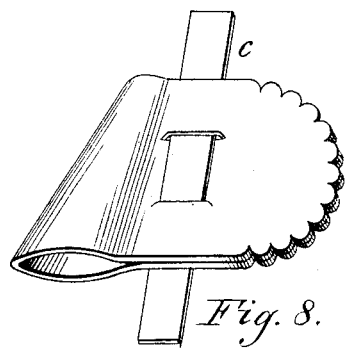
Figure 10:
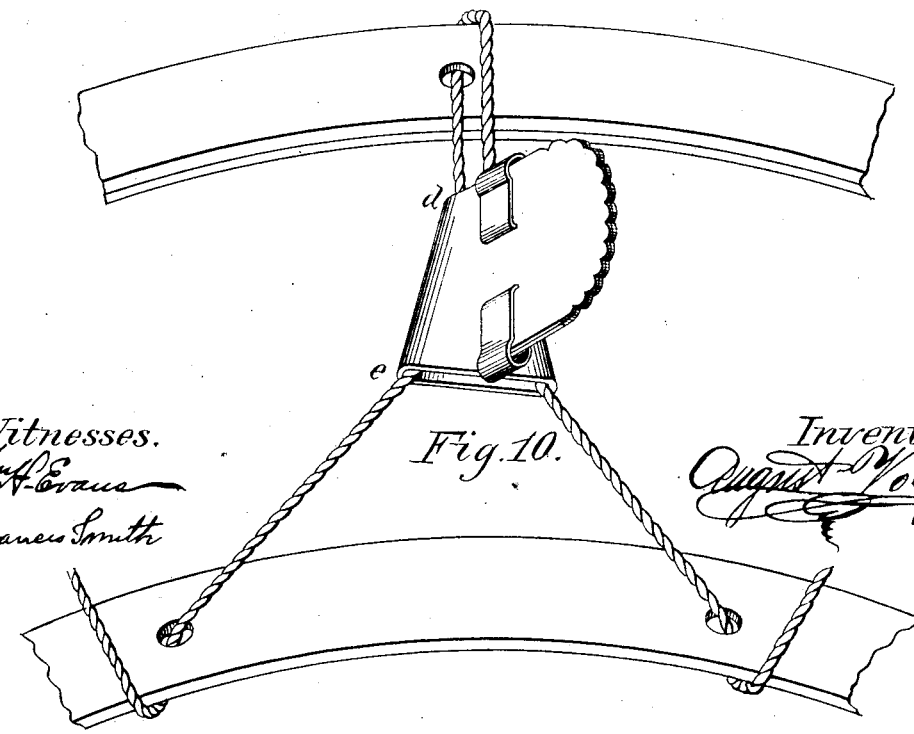

Fig. 1 shows the shape in which the leather or other material should be cut, and with the apertures for the first method of lacing. Fig. 2 shows the shape in which the tin or other metal should be cut for the first-mentioned method of lacing. Fig. 3 shows the strap in said first method of lacing, with the projection *f* inserted in the proper place, with the ends of metal partly bent, with the round or convex bend or head at the lower part of strap. Fig. 4 shows the ends of complete strap and the tin bent down in place, and the projection *f* bent down in its position, *c* being the mark denoting the meeting of the ends of tin, and the letters C C the convex heads or bends. Fig. 5 shows the said strap complete and placed in its position on the drum cords or lacings. Fig. 6 shows the shape in which the leather or other material should be cut, with the apertures A A for inserting the metal lacings under the second method. Fig. 7 shows the position and shape of the straight strip of tin or metal for said second method when folded on the strap. Fig. 8 shows the said straight strip of metal inserted through the apertures of strap in second method preparatory to bending same over on the strap. Fig. 9 shows the ends of tin strip in second method bent down in position, and the said strap complete. Fig. 10 shows the strap complete in its position on the drum cords or lacings in use.

Having thus described my invention, I claim—

1. A drum-strap for adjusting and tightening the cords and holding the upper and lower heads of drums to the body of the same, which consists of a strip of leather or other suitable material cut in the form described and shown, and provided with slits or apertures, and adapted to be folded and receive in the apertures the metallic lacing-pieces, folded in the manner substantially as and for the purposes described.

2. The metallic lacing-piece for drum-straps, consisting of the strip having projection *f*, and adapted to be inserted in the apertures of the strap and bent upon the same, substantially as and for the purpose set forth.

3. A drum-strap of the form and folded as described and shown, and provided with apertures, in combination with metallic lacing-pieces laced and folded substantially as set forth.

AUGUST VOEGE.

Witnesses:
WM. H. EVANS,
FRANCIS SMITH.